(12) United States Patent
Liu

(10) Patent No.: US 7,411,749 B2
(45) Date of Patent: Aug. 12, 2008

(54) DUSTPROOF LENS ASSEMBLY

(75) Inventor: ChunXi Liu, Suzhou Industrial Park (CN)

(73) Assignee: Ether Precision, Inc., Grand Cayman (KY)

( * ) Notice: Subject to any disclaimer, the term of this patent is extended or adjusted under 35 U.S.C. 154(b) by 0 days.

(21) Appl. No.: 11/703,840

(22) Filed: Feb. 8, 2007

(65) Prior Publication Data

US 2007/0253061 A1    Nov. 1, 2007

(30) Foreign Application Priority Data

Nov. 2, 2006    (TW) .............................. 95140608 A

(51) Int. Cl.
*G02B 7/02* (2006.01)

(52) U.S. Cl. .................. 359/819; 359/822; 359/823

(58) Field of Classification Search ................ 359/813, 359/814, 819, 822–824, 717, 719
See application file for complete search history.

(56) References Cited

U.S. PATENT DOCUMENTS

| 5,699,200 A * | 12/1997 | Uno et al. .................... 359/700 |
| 2002/0071190 A1* | 6/2002 | Wada et al. .................. 359/819 |
| 2007/0139795 A1* | 6/2007 | Li .............................. 359/796 |

* cited by examiner

*Primary Examiner*—Mohammed Hasan
(74) *Attorney, Agent, or Firm*—Troxell Law Office, PLLC

(57) ABSTRACT

A dustproof lens assembly includes a holder and a barrel. The holder has an inner space, in which an image sensor is received. The holder and the barrel have connecting portions for engagement and a block portion is provided between the inner space and the connecting portions to block dust between the first connecting portion and the second connecting portion out of the inner space of the holder and give the image sensor a clean environment.

10 Claims, 3 Drawing Sheets

DUSTPROOF LENS ASSEMBLY

BACKGROUND OF THE INVENTION

1. Field of the Invention

The present invention relates generally to an optical lens assembly, and more particularly to a dustproof lens assembly.

2. Description of the Related Art

FIG. 1 shows an image catch unit 1 of an electronic product, such as digital camera, digit personal assistant (PDA), and mobile phone, includes an optical lens assembly 2 and an image sensor 3. The image sensor 3 is electrically connected to a flexible printed circuit board (FPCB) 4, and the optical lens assembly 2 is mounted on the image sensor 3. The optical lens assembly 2 includes a holder 5, on a bottom of which the image sensor 3 is provided, a barrel 6 mounted on the holder 5 and lens 7 mounted in the barrel 6. Light is emitted to the image sensor 3 through the lens 7 and the holder 5 to generate an image signal. The FPCB 4 receives the image signal and transmits it to a circuit board of the electronic product.

The barrel 6 and the holder 5 have a threaded section 8 respectively so that the barrel 6 is screwed into the holder 5. We find that dust always is received between the threaded sections 8 of the barrel 6 and the holder 5 and will drop onto the image sensor 3 when the image catch unit 1 is moved or vibrated. The dust on the image sensor 3 will greatly affect a performance of the image sensor 3.

An improved lens assembly was provided to avoid the dust problem, which provides a film around the image sensor to block the dust. In practice, the film blocks the dust under the image sensor only. The dust between the threaded sections of the barrel and the holder still drops onto the image sensor directly rather than onto the film while the image catch unit is leaning. As a result, this lens assembly still has dust on the image sensor.

SUMMARY OF THE INVENTION

The primary objective of the present invention is to provide a dustproof lens assembly, which may prevent dust between the barrel and the holder from dropping onto the image sensor.

According to the objective of the present invention, a dustproof lens assembly includes a holder and a barrel. The holder has an inner space, in which an image sensor is received. The holder and the barrel have connecting portions for engagement and a block portion is provided between the inner space and the connecting portions to block dust between the first connecting portion and the second connecting portion out of the inner space of the holder and give the image sensor a clean environment.

DETAILED DESCRIPTION OF THE INVENTION

Figure 1:
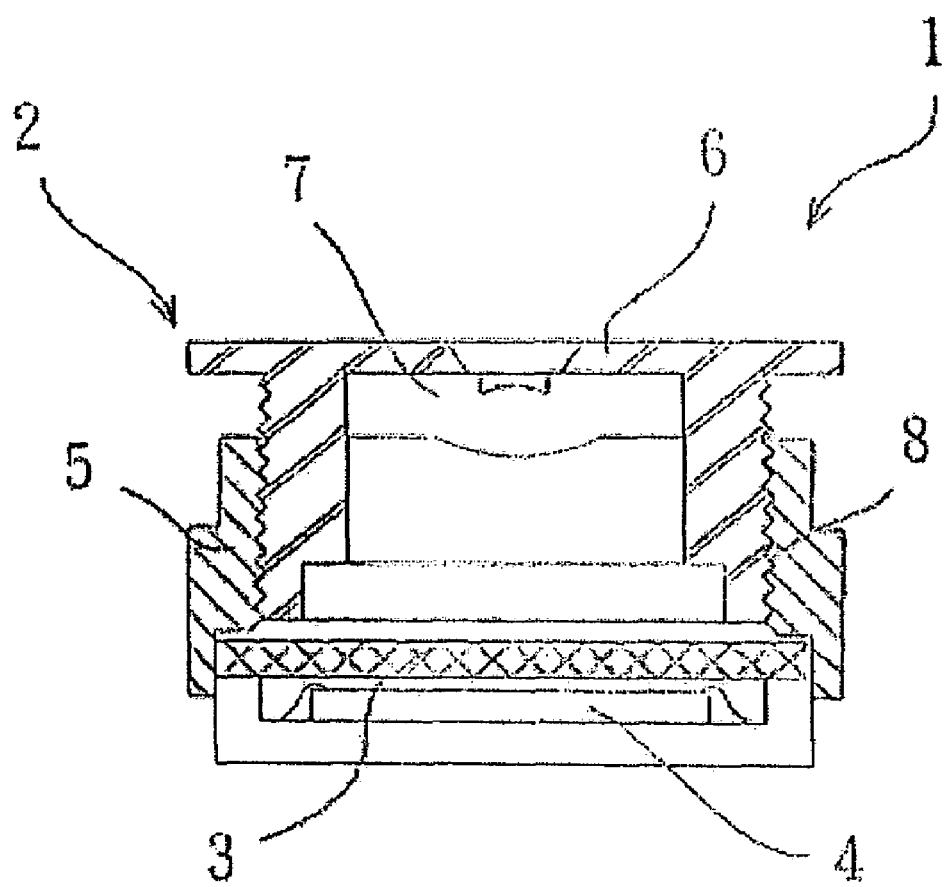
FIG. 1 is a sectional view of the conventional image catch unit.
Figure 2:
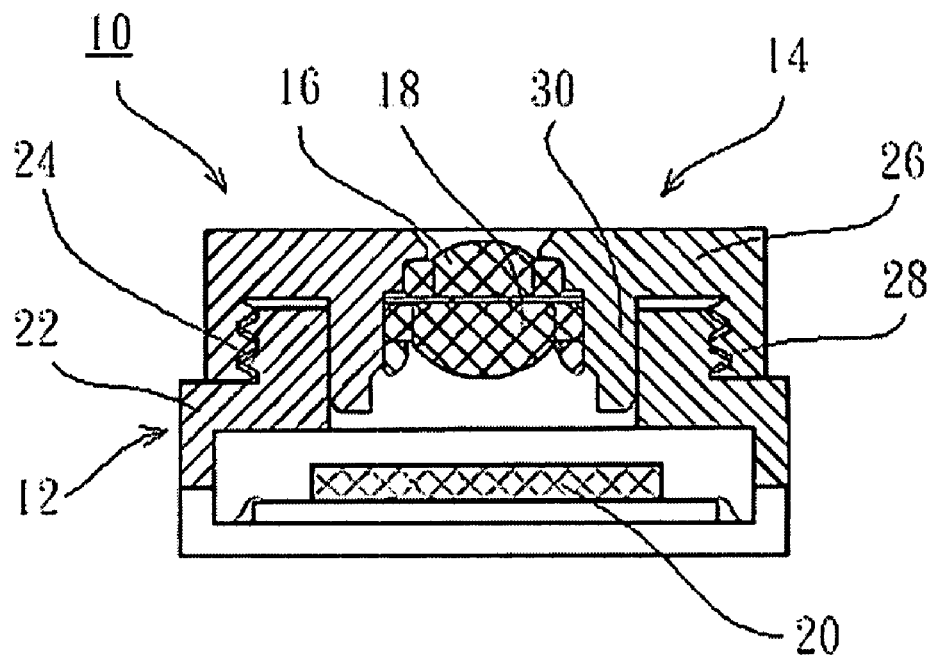
FIG. 2 is a sectional view of a first preferred embodiment of the present invention.
Figure 3:
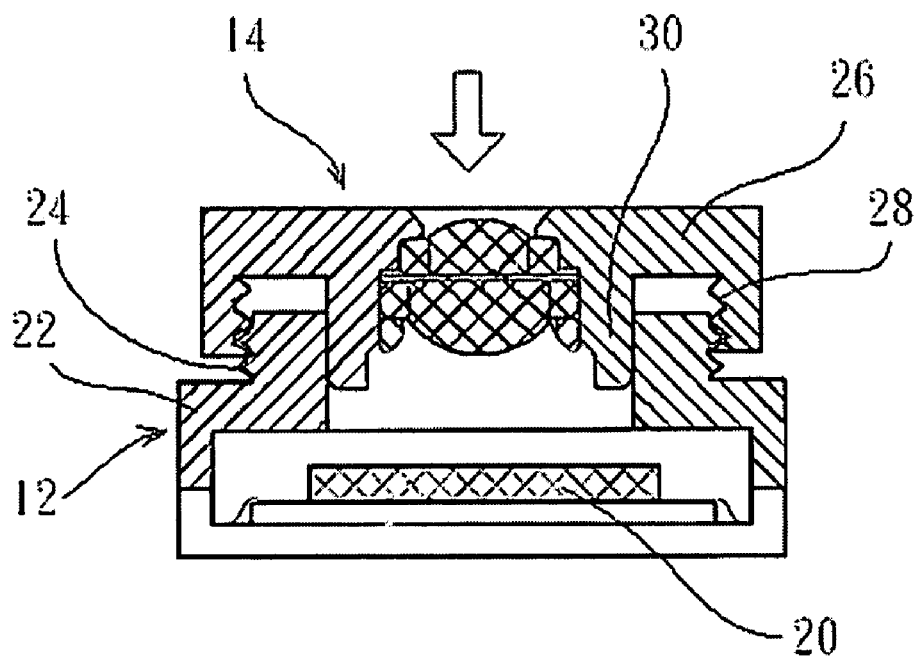
FIG. 3 is a sectional view of the first preferred embodiment of the present invention, showing the barrel being screwed onto the holder.

As shown in FIG. 2 to FIG. 3, a dustproof lens assembly 10 of the first preferred embodiment of the present invention, which is mounted on an image sensor 20, includes a holder 12 and a barrel 14.

The holder 12 has a hollow member 22 with an inner space therein and a first connecting portion 24 oh a top thereof. The first connecting portion 24 has an outer threaded section on a circumference thereof.

The barrel 14 has a hollow member 26 and two lenses 16 and 18 mounted in the hollow member 26. The hollow member 26 has a second connecting portion 28 on a bottom thereof. The second connecting portion 28 is complementary to the first connecting portion 24, which has an inner threaded section to be meshed with the outer threaded section of the first connecting portion 24. The hollow member 26 further has a block portion 30, which is an annular protrusion on the bottom of the hollow member 26 within the second connecting portion 28. A distance between the second connecting portion 28 and the block portion 30 is about identical to a thickness of the first connecting portion 24 of the holder 12.

As shown in FIG. 3, the barrel 14 has the second connecting portion 28 meshed with the first connecting portion 24 of the holder 12 and the block portion 30 against an interior wall of the hollow member 22 of the holder 12. The threaded sections of the barrel 14 and the holder 12 are isolated from the inner space of the holder 12 by the block portion 30, therefore, dust received between the threaded sections of the barrel 14 and the holder 12 will not drop into the inner space of the holder 12 in any condition, no matter the lens assembly 10 is leaning, even is upside down. The threaded sections of the barrel 14 and the holder 12 may be worn when the barrel 14 is screwed onto the holder 12, and the worn pieces are isolated by the block portion 30 also to keep the image sensor 20 in a dust-free condition.

Figure 4:
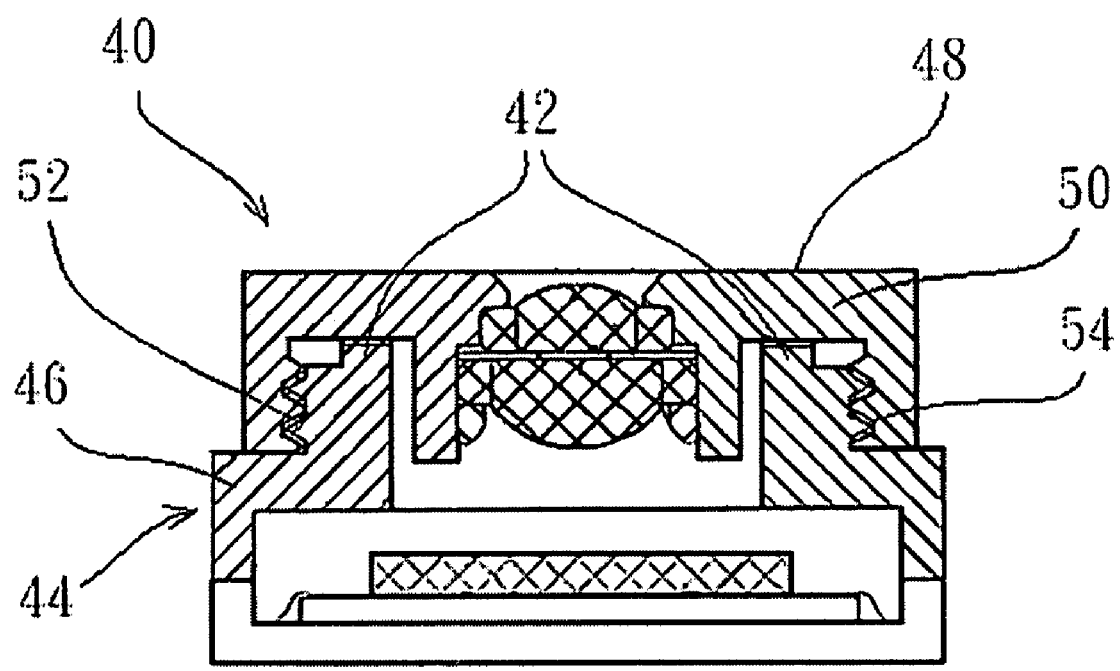
FIG. 4 is a sectional view of a second preferred embodiment of the present invention.

FIG. 4 shows a lens assembly 40 of the second preferred embodiment of the present invention, which is similar to the first preferred embodiment, except that a holder 44 has a block portion 42 on a top of a first connecting portion 52 of a hollow member 46 thereof. The block portion 42 is against a hollow member 50 of a barrel 48 to isolate the first connecting portion 52 of the holder 44 and a second connecting portion 54 of the barrel 48 from an inner space of the holder 44 that keeps dust between the first and second connecting portions 52 and 54 out of the inner space of the holder 44 and give an image sensor 40 a dust-free environment.

In conclusion, the present invention provides the block portion between the connecting portions of the barrel and the holder and the inner space of the holder to keep the dust between the connecting portions out and give the image sensor in the inner space of the holder a dust-free environment.

The description above is a few preferred embodiments of the present invention and the equivalence of the present invention is still in the scope of the claim of the present invention.

What is claimed is:

1. A dustproof lens assembly, comprising:

a holder having an inner space therein and a first connecting portion; and a barrel, in which lenses are mounted, having a second connecting portion, which is complementary to the first connecting portion of the holder, for engagement of the barrel and the holder and a block portion between the second connecting portion and the inner space to block dust between the first connecting portion and the second connecting portion out of the inner space of the holder, wherein the second connecting portion is an annular wall on a bottom of the barrel and the block portion is an annular protrusion on the bottom of the barrel within the second connecting portion.

2. The dustproof lens assembly as defined in claim 1, wherein the block portion of the barrel is attached on the holder while the barrel is engaged with the holder.

3. The dustproof lens assembly as defined in claim 1, wherein the first connecting portion of the holder is received between the second connecting portion and the block portion of the barrel.

4. The dustproof lens assembly as defined in claim 3, wherein a distance between the second connecting portion and the block portion of the barrel is substantially identical to a thickness of the second connecting portion of the holder.

5. The dustproof lens assembly as defined in claim 3, wherein the first connecting portion has a threaded section on an exterior side thereof and the second connecting portion has a threaded section on an interior side thereof.

6. A dustproof lens assembly, comprising:
   a holder having an inner space therein, a first connecting portion and a block portion between the inner space and the first connecting portion; and
   a barrel, in which lenses are mounted, having a second connecting portion, which is complementary to the first connecting portion of the holder, for engagement of the barrel and the holder, wherein the block portion blocks dust between the first connecting portion and the second connecting portion out of the inner space of the holder, wherein the first connecting portion is an annular wall on a ton of the holder and the block portion is an annular protrusion on a ton of the second connecting portion.

7. The dustproof lens assembly as defined in claim 6, wherein the block portion of the holder is attached on the barrel while the barrel is engaged with the holder.

8. The dustproof lens assembly as defined in claim 6, wherein the block portion is on a top of the second connecting portion.

9. The dustproof lens assembly as defined in claim 6, wherein the second connecting portion of the barrel is an annular wall on a bottom thereof with a diameter greater than that of the first connecting portion of the holder.

10. The dustproof lens assembly as defined in claim 9, wherein the first connecting portion has a threaded section on an exterior side thereof and the second connecting portion has a threaded section on an interior side thereof.

* * * * *